3,338,783
SYNERGISTIC INSECTICIDAL COMPOSITIONS
George J. Popjak, Maidstone, England, assignor to Shell Oil Company, New York, N.Y., a corporation of Delaware
No Drawing. Filed July 19, 1965, Ser. No. 473,197
Claims priority, application Great Britain, July 24, 1964, 29,752/64
7 Claims. (Cl. 167—33)

This invention relates to novel compositions containing methylenedioxyphenyl compounds and organophosphorus or carbamate insecticides. More particularly the invention relates to novel insecticidal compositions wherein the methylenedioxyphenyl compounds synergize or activate the toxicity of the organophosphorus or carbamate insecticides.

Several organic chemicals are known to synergize organophosphorus insecticides (U.S. Patent 3,053,729) and carbamate insecticides (U.S. Patent 3,134,712). These synergists have the disadvtange of requiring a high ratio of the synergist in relation to the toxicant, are relatively expensive, and enhance the toxicity of a restricted number of insecticides against relatively few insect species. Most have been found to be effective synergists only against the house fly.

There has now been found a class of methylenedioxyphenyl compounds which are effective synergists for a broad class of organophosphorus and carbamate insecticides. These synergistic methylenedioxyphenyl compounds are relatively inexpensive when compared to the cost of known synergists. Surprisingly, novel compositions containing the methylenedioxyphenyl compounds of the invention have been found to enhance the toxicity of organophosphate and carbamate insecticides against a wide spectrum of insect species. By the addition of the synergist of the invention the quantity of insecticide may be considerably reduced. Thus a much reduced mammalian toxicity hazard is achieved.

The compositions of the invention contain an insecticide, an appropriate diluent and at least one compound characterized by the following general formula:

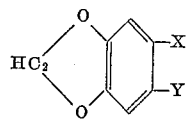

wherein X represents chlorine, bromine or cyano, cyanomethyl, hydroxymethyl, mercaptomethyl, ethynyl, thioamide

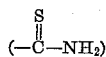

a group of formula —CH=NOC(O)R'' (wherein R'' represents alkyl of up to 4 carbon atoms); Y represents hydrogen, chlorine or bromine.

Preferred because of their high activity as synergists are those methylenedioxy compounds of the above formula wherein X represents chlorine, bromine, cyano, or cyanomethyl and Y represents chlorine or bromine. Such effective synergists are represented by:

2-bromo-4,5-methylenedioxybenzonitrile
2-chloro-4,5-methylenedioxybenzonitrile
2-bromo-4,5-methylenedioxybenzyl cyanide
2-chloro-4,5-methylenedioxybenzyl cyanide
1,2-dibromo-4,5-methylenedioxybenzene
1,2-dichloro-4,5-methylenedioxybenzene.

Other methylenedioxy compounds showing synergistic activity are:

2-bromo-4,5-methylenedioxybenzyl alcohol
2-bromo-4,5-methylenedioxybenzyl thiol
1-ethynyl-3,4-methylenedioxybenzene
O-acetyl-2-bromo-4,5-methylenedioxybenzaldoxime
O-acetyl-2-chloro-4,5-methylenedioxybenzaldoxime
6-chloro-3,4-methylenedioxythiobenzamide These methylenedioxy compounds are effective synergists for the following organophosphorus and carbamate insecticides.

The organophosphorus insecticides that are synergized are the vinyl phosphate insecticides of the formula:

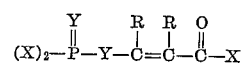

wherein each X independently represents R', R'O—, R'HN—, R'₂N—, R'OR'O—, or

where R' is an alkyl group of up to six carbon atoms, an aryl group such as phenyl, tolyl, naphthalenyl, anthracenyl, or benzyl, an aralkyl group, the alkyl portion of which contains up to six carbon atoms, and the aryl portion of which is phenyl, tolyl, naphthalenyl, anthracenyl or benzyl. R' may be unsubstituted or substituted with groups such as amino, nitro, and halogen. Each R independently represents hydrogen, chlorine, bromine, or an alkyl group of up to six carbon atoms. Y is sulfur or oxygen.

Exemplary of such organophosphate insecticides are:

3-dimethoxyphosphinyloxy-N,N-dimethyl-cis-crotonamide;
3-dimethoxyphosphinyloxy-N,N-diethyl-cis-crotonamide;
3-diethoxyphosphinyloxy-N,N-dimethyl-cis-crotonamide;
3-dimethoxyphosphinyloxy-N-methyl-N-hydroxy-cis-crotonamide;
O,O-dimethyl O-(2-carbomethoxy-1-methylvinyl) phosphate;
O,O-dimethyl O-[2-chloro-2-(N,N-diethylcarbamoyl)-1-methylvinyl]phosphate;
dimethyl 2-(alpha-methylbenzyl)-1-methylvinyl phosphate.

Carbamate insecticides that are synergized have the following formula:

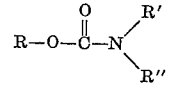

wherein R represents an aryl group of up to ten carbon atoms such as phenyl, tolyl, naphthalenyl, or anthracenyl. The aryl group may be unsubstituted or substituted with one or more of such groups as alkyl of one to four carbon atoms, amino, nitro, and halogen. R' and R'' independently represent hydrogen or alkyl of one to four carbon atoms.

Exemplary of such carbamate insecticides are:

3,4,5-trimethylphenyl-N-methylcarbamate;
1-naphthyl methylcarbamate;
4-dimethylamino-3,5-xylyl methylcarbamate;
2,3-dimethoxyphenyl-N-methylcarbamate;
m-isopropylphenyl-N-methylcarbamate.

To illustrate the performance of synergistic compositions according to the invention 3-dimethoxyphosphinyloxy-N,N-dimethyl-cis-crotonamide will be used to typify an organophosphorous insecticide and 3,4,5-trimethylphenyl-N-methylcarbamate will be used as an example of a carbamate insecticide.

In addition to the insectide and the methylenedioxy compounds the compositions of the invention may also comprise a carrier or a surface active agent or both a carrier and a surface active agent.

The carrier may be solid or fluid, inorganic or organic, and may be of synthetic or natural origin. It is preferably biologically and chemically inert.

Solid carriers may comprise china clays, silicates, synthetic hydrated silicon oxides, resins, waxes, polymeric materials or elemental substances. The carrier may also be a fertilizer. With certain solid carriers, a stabilizer for the active ingredient or ingredients may be necessary. Examples of suitable liquid carriers are water, alcohols, ketones, aromatic hydrocarbons, chlorinated hydrocarbons and suitable petroleum fractions. Also included are liquified, normally vaporous or gaseous materials, or a vaporous or gaseous material, and may be solvent or non-solvents for the active ingredient or ingredients. Mixtures of different liquids are often suitable.

The surface active agent may be a wetting agent, an emulsifying agent, a dispersing agent or a sticker.

The amount of inert carrier in the composition may vary from 25% by weight to 99% by weight of the total formulation.

The compositions of the invention may be formulated in any of the conventional forms, e.g., wettable powders, dusts, granules, concentrates, solutions, emulsifiable concentrates, emulsions and aerosols.

The concentrations of the synergists may vary considerably in the insecticidal compositions of the invention. The synergists may be present in concentrations of from 30%–1000% by weight, the percetages being expressed with respect to the total weight of the active ingredients of the insecticidal composition, but smaller or higher concentrations may be employed. From 200% to 500% by weight of the synergist is, in general, preferred.

The concentration of the synergists may also be expressed as the synergist/insecticide ratio. This ratio may be from 0.3:1–10:1 by weight, but a ratio of from 2:1 to 5:1 is, in general, preferred.

The synergistic activity of the methylenedioxy compounds was tested by the following procedure using *Musca domestica* (house flies). An acetone solution was prepared containing the synergist to be tested and 3-dimethyloxyphosphinyloxy-N,N-dimethyl-cis-crotonamide as insecticide (5:1): a sample was taken up in a micrometer syringe. Twenty adult female house flies were anaesthetised with carbon dioxide and one microliter of the solution was applied to the ventral abdomen of each fly. The treated flies were then placed in glass jars each containing a small quantity of sugar as food for the flies. Twenty-four hours later the number of dead and moribund flies was recorded. Similar tests were carried out with acetone solutions containing the synergist to be tested and 3,4,5-trimethylphenyl-N-methylcarbamate. Further tests were carried out with acetone solutions containing 3-dimethyloxyphosphinyloxy-N,N-dimethyl-cis-crotoamide and 3,4,5-trimethylphenyl-N-methylcarbamate alone. The results were presented in the form of "coefficients of cotoxicity" which is defined as $$\frac{LD_{50} \text{ of insecticide}}{LD_{50} \text{ of insecticide in synergist/insecticide composition}} \times 100$$

Coefficients of cotoxicity greater than 100 indicated a synergistic effect; however, to allow for experimental error, a value of more than 150 is a better indication of synergism. The following table gives the results obtained.

TABLE I

| Synergist | Coefficient of Cotoxicity with respect to— | |
|---|---|---|
| | 3-dimethyloxyphosphinyloxy-N,N-dimethyl-cis-crotonamide | 3,4,5-trimethyl phenyl-N-methyl carbamate |
| (1) 2-bromo-4,5-methylenedioxybenzonitrile | 447 | 700 |
| (2) 2-chloro-4,5-methylenedioxybenzonitrile | 474 | 820 |
| (3) 2-bromo-4,5-methylenedioxybenzyl cyanide | 532 | 630 |
| (4) 2-chloro-4,5-methylenedioxybenzyl cyanide | 512 | 720 |
| (5) 1,2-dibromo-4,5-methylenedioxybenzene | 420 | 385 |
| (6) 1,2-dichloro-4,5-methylenedioxybenzene | 320 | 266 |
| (7) 1-ethynyl-3,4-methylenedioxybenzene | 260 | 297 |
| (8) Piperonyl butoxide | 123 | 223 |
| (9) Sesamex | 324 | 500 |

Piperonyl butoxide and sesamex were included for comparative purposes. It will be noted that in the case of 3-dimethyloxyphosphinyloxy-N,N-dimethyl-cis-crotonamide and 3,4,5-trimethylphenyl-N-methylcarbamate, all the listed compounds have a superior synergistic activity to that of piperonyl butoxide, and most have a superior synergistic activity to sesamex.

In addition to *Musca domestica* four other species have been included in the synergist bioassay tests. These are *Aedes aegypti*, (yellow fever mosquito) larvae, *Phaedon cochleariae* (mustard beetle). *Plutella maculipennis* (diamond-back moth) larvae, *Dysdercus fasciatus* (cotton stainer) nymphs. The tests comprise exposure to aqueous dispersions for mosquito larvae, exposure to sprayed foliage for mustard bettles and diamond-back moth larvae, and direct spraying for cotton stainer. The tests were carried out using 2-chloro-4,5-methylenedioxybenzonitrile with 3 - dimethyloxyphosphinyloxy-N,N-dimethyl-cis-crotonamide and with 3,4,5-trimethylphenyl-N-methylcarbamate in the relative proportions of 5:1 for all species. The results are given in Table II.

TABLE II

| Species | Coefficients of Cotoxicity with respect to— | |
|---|---|---|
| | 3-dimethyloxyphosphinyl-oxy-N,-dimethyl-cis-crotonamide | 3,4,5-trimethyl-phenyl-N-methyl carbamate |
| *Musca domestica* | 474 | 820 |
| *Aedes aegypti* | 218 | 625 |
| *Phaedon cochleariae* | 105 | 200 |
| *Plutella maculipennis* | 197 | 940 |
| *Dysdercus fasciatus* | Not tested | 245 |

The results obtained indicate that synergistic activity is shown for a wide range of insect species.

The mammalian toxicity of compositions containing a methylenedioxyphenyl compound of the invention with 3-dimethyloxyphosphinyloxy - N,N - dimethyl-cis-crotonamide or 3,4,5-trimethylphenyl-N-methylcarbamate was compared wth the mammalian toxicity of compositions of these insecticides containing piperonyl butoxide or sesamex. Each composition was tested by orally dosing ten Carworth Farm No. 1 mice with a dimethyl sulfoxide solution containing 1% by weight of 3-dimethyloxyphosphinyloxy-N,N-dimethyl-cis-crotonamide and 5% by weight of synergist or 2% by weight of 3,4,5-trimethylphenyl-N-methylcarbamate with 10% by weight of synergist. Seven days later the number of dead mice was recorded. The results of the tests are given in Table III below in which each figure represents the number of mouse deaths which occurred: the dosage rate in milligrams of 3-dimethyloxyphosphinyloxy-N,N-dimethyl-cis-crotonamide and 3,4,5-trimethylphenyl-N-methylcarbamate per kilogram body weight of mouse is also given.

TABLE III

| Insecticide | Dose rate of Insecticide (mg./kg.) | Insecticide plus 2-chloro-4,5-methyl-enedioxy-benzonitrile | Insecticide plus piperonyl butoxide | Insecticide plus sesamex |
|---|---|---|---|---|
| 3-dimethyloxyphosphinyloxy-N,N-dimethyl-cis-crotanamide. | 10 | 0 | 0 | 0 |
|  | 16 | 0 | 0 | 1 |
|  | 40 | 10 | 10 | 10 |
| 3,4,5-trimethylphenyl-N-methylcarbamate | 63 | 10 | 10 | 10 |
|  | 80 | 0 | 6 | 10 |
|  | 100 | 3 | 9 | 10 |
|  | 125 | 5 | 8 | 10 |
|  | 160 | 8 | 10 | 10 |

In addition to at least one methylenedioxyphenyl compound and at least one insecticide, the compositions of the present invention may also contain other pesticidally active materials, or, more generally, other biocidally active materials.

I claim as my invention:

1. The insecticidal composition comprising one part of an insecticide selected from 3-dimethoxyphosphinyloxy-N,N-dimethyl-cis-crotonamide and 3,4,5-trimethylphenyl-N-methylcarbamate; and from 0.3 to 10 parts of a compound of the formula

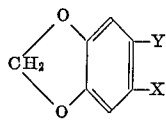

wherein

Y is a monovalent radical selected from the group consisting of —CN and —CH$_2$CN and X is a halogen atom selected from the group consisting of bromine and chlorine.

2. The composition of claim 1 wherein the insecticide is 3 - dimethoxyphosphinyloxy - N,N - dimethyl - cis-crotonamide.

3. The composition of claim 1 wherein the insecticide is 3,4,5-trimethylphenyl-N-methylcarbamate.

4. The composition of claim 1 wherein the compound is 2-chloro-4,5-methylenedioxybenzonitrile.

5. The composition of claim 1 wherein the compound is 2-bromo-4,5-methylenedioxybenzonitrile.

6. The composition of claim 1 wherein the compound is 2-chloro-4,5-methylenedioxybenzyl cyanide.

7. The composition of claim 1 wherein the compound is 2-bromo-4,5-methylenedioxybenzyl cyanide.

References Cited

UNITED STATES PATENTS

| | | | |
|---|---|---|---|
| 2,764,517 | 9/1956 | Beroza | 167—33 |
| 2,904,465 | 9/1959 | Moorefield | 167—33 |
| 2,920,993 | 1/1960 | Fairchild | 167—22 |
| 2,927,880 | 3/1960 | Casida | 167—22 |
| 3,053,729 | 9/1962 | Sun | 167—22 |
| 3,130,122 | 4/1964 | Kuderna | 167—30 |
| 3,134,712 | 5/1964 | Bywater | 167—30 |

OTHER REFERENCES

Barthel: Chem. Abstracts 53 (1958) P1621i P.O.S.L.

Barthel et al.: U.S. Department of Agriculture, ARS 33–42, September 1957.

Beroza. J. Agr. Food Chem. 5 No. 11, November 1957, pp. 855-859, P.O.S.L.

Prill: Contributions from the Boyce Thompson Institute, 14 (1946), pp. 221–227.

ALBERT T. MEYERS, Primary Examiner.

JULIAN S. LEVITT, Examiner.

S. J. FRIEDMAN, Assistant Examiner.